June 4, 1963 W. R. ALLEN 3,091,890

PUPPET AND ACTUATING MEANS THEREFOR

Filed Dec. 26, 1957 8 Sheets-Sheet 1

INVENTOR.
William R. Allen.
BY
Harold J. LeVesconte
Att'y.

PUPPET AND ACTUATING MEANS THEREFOR

Filed Dec. 26, 1957

INVENTOR.
William R. Allen.
BY
Harold J LeVesconte
Att'y.

June 4, 1963 W. R. ALLEN 3,091,890

PUPPET AND ACTUATING MEANS THEREFOR

Filed Dec. 26, 1957 8 Sheets-Sheet 3

INVENTOR.
William R. Allen.
BY
Harold J. De Vesconte
Atty.

INVENTOR.
William R. Allen.
BY
Harold J. Le Vesconte
Atty.

June 4, 1963 W. R. ALLEN 3,091,890

PUPPET AND ACTUATING MEANS THEREFOR

Filed Dec. 26, 1957 8 Sheets-Sheet 5

INVENTOR.
William R. Allen.
BY
Harold J. LeVescoute
Atty.

June 4, 1963 W. R. ALLEN 3,091,890

PUPPET AND ACTUATING MEANS THEREFOR

Filed Dec. 26, 1957 8 Sheets-Sheet 6

INVENTOR.
William R. Allen.
BY
Harold J. LeVesconte
Atty.

June 4, 1963 W. R. ALLEN 3,091,890

PUPPET AND ACTUATING MEANS THEREFOR

Filed Dec. 26, 1957 8 Sheets-Sheet 7

INVENTOR.

William R. Allen.

BY

Harold J. LeVesconte

Att'y.

June 4, 1963 W. R. ALLEN 3,091,890

PUPPET AND ACTUATING MEANS THEREFOR

Filed Dec. 26, 1957 8 Sheets-Sheet 8

INVENTOR.

William R. Allen

BY

Harold J. LeVecoute

Att'y.

3,091,890
PUPPET AND ACTUATING MEANS THEREFOR
William R. Allen, 2029 N. Kenmore Ave., Los Angeles 27, Calif.
Filed Dec. 26, 1957, Ser. No. 705,183
11 Claims. (Cl. 46—126)

This invention relates to puppets and marionettes and operating devices therefor, the operated portions being hereinafter referred to as puppets.

Heretofore, the usual manner of operating the class of puppets which are suspended from operating means has been by means of strings attached externally to various portions of the "anatomy" of the puppet and at their other ends to plural armed frames held in the hands of the operator.

The principal object of the present invention is to provide a puppet which is more life-like in appearance and action and which is suspended from an operating apparatus and separately actuated by a series of keys on the apparatus through strings or cords which enter the interior of the puppet and are thence conducted to and attached to appropriate portions of the puppet structure.

Another object of the invention is to provide a puppet and operating means therefor in which the face of the puppet is formed of a flexible material such as soft rubber and in which operating strings or cords extend from a manual operating means to portions of the face for imparting facial expressions to the puppet.

A further object of the invention is to provide a puppet operating means comprising a keyboard structure adapted to support a puppet suspended therefrom and by which the pupet is actuated by means other than the suspending means.

Still another object of the invention is to provide a puppet and actuating means therefor in which means is provided for maintaining the puppet moving in a horizontal plane whereby such movements of the puppet as in walking or running are maintained in a natural relation to the surface on which the puppet appears to be moving.

A still further object of the invention is the provision of a puppet and puppet actuating apparatus which includes an operating keyboard means including separate keyboards for the head, torso and leg sections of the puppet and in which master key means are provided for optional operation of certain groups of actuating keys for co-ordinated actions such as walking or running.

Still another object of the invention is to provide a puppet supporting and actuating apparatus which includes means by which the puppet may be turned relative to the operating means.

Figures 1, 2, 5, 6:
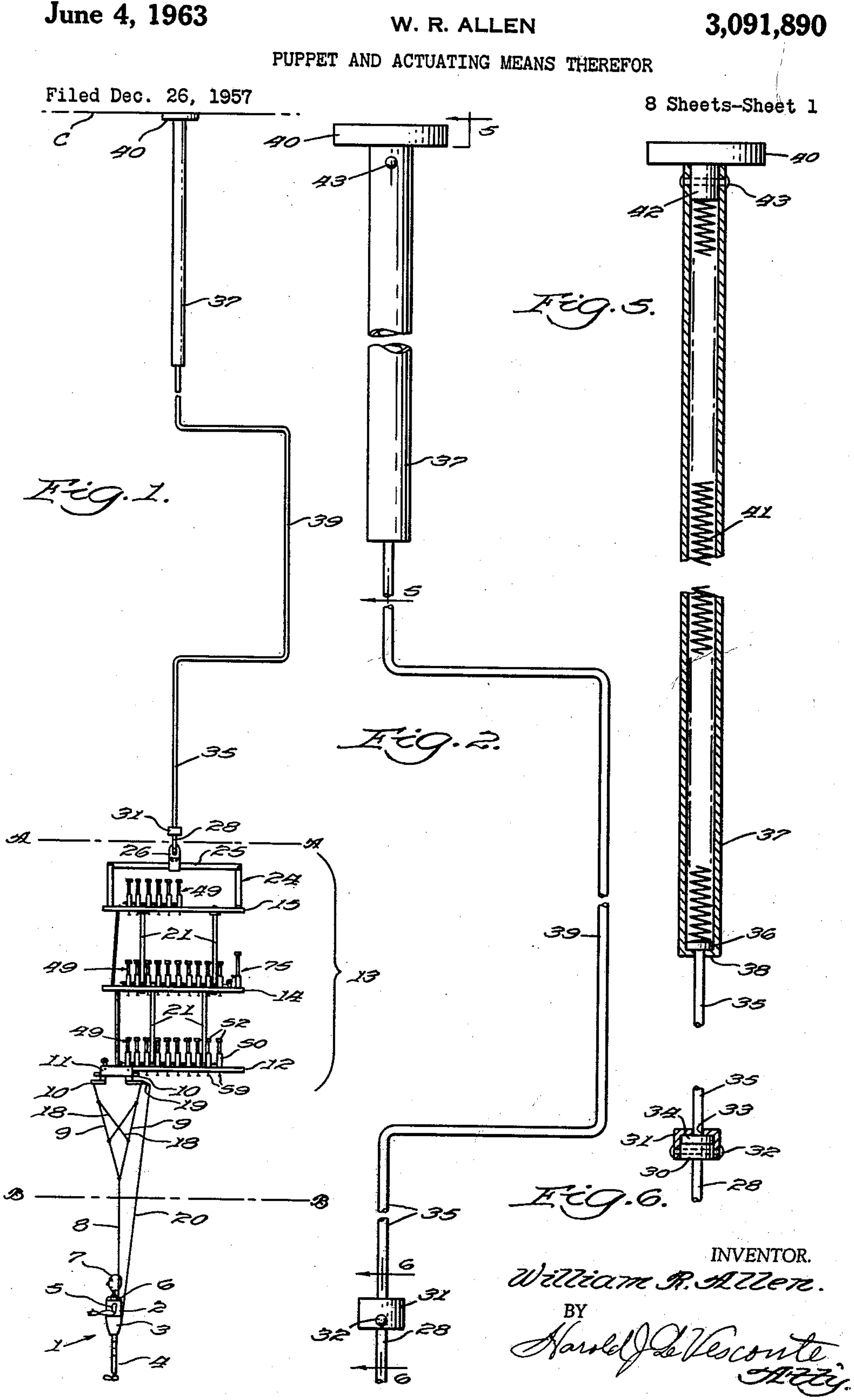

With the foregoing objects in view, together with such additional objects and advantages as may subsequently appear, the invention resides in the parts, and in the construction, combination and arrangement of parts described, by way of example, in the following specification of a presently preferred embodiment of the invention, reference being had to the accompanying drawings which form a part of said specification and in which drawings:

FIG. 1 is a side elevation of a complete apparatus comprising a puppet and the associated supporting and actuating apparatus, the puppet in this and all other figures being shown without the costume it would ordinarily wear.

Figures 3, 7:
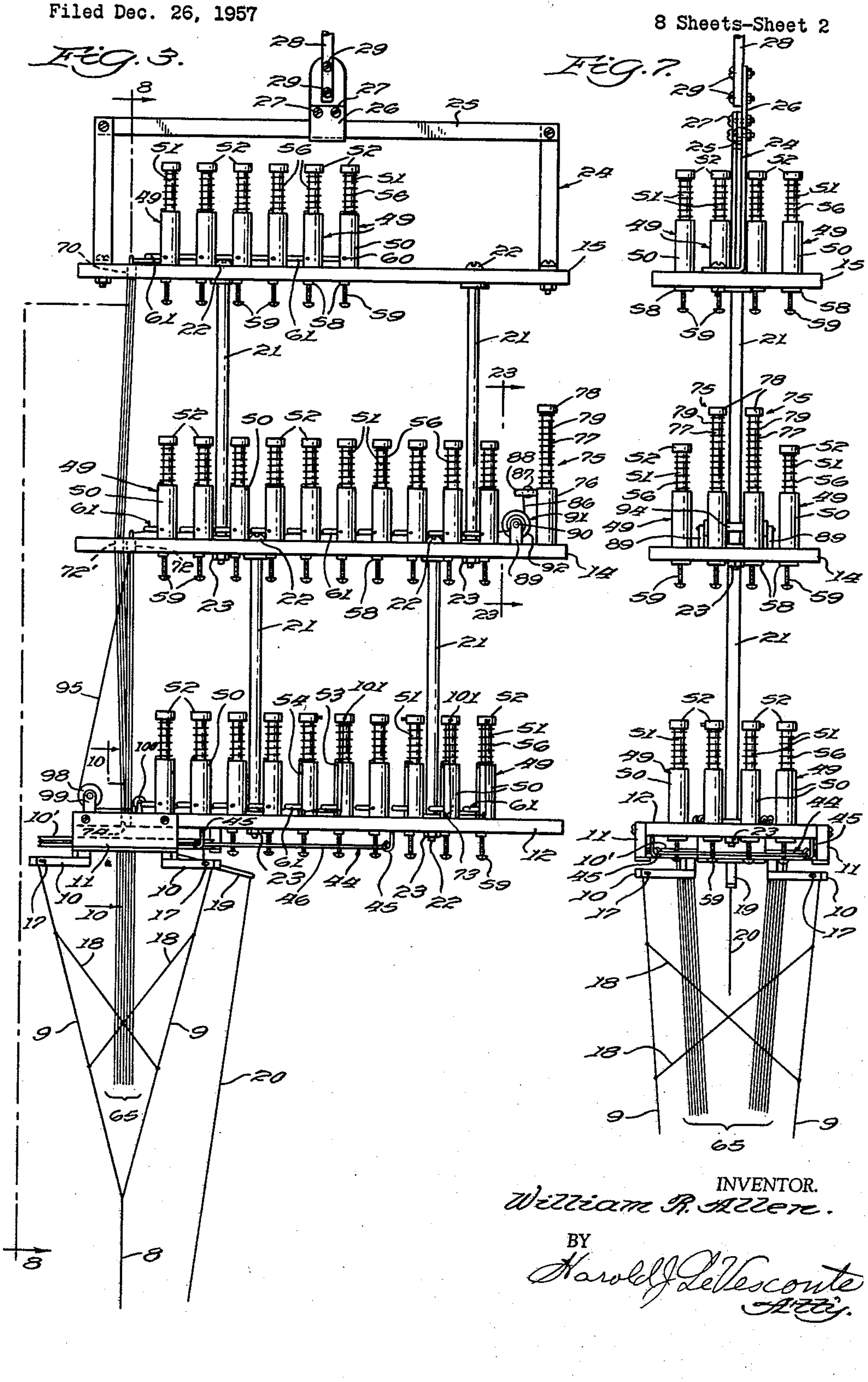
Figures 4, 8, 9, 10:
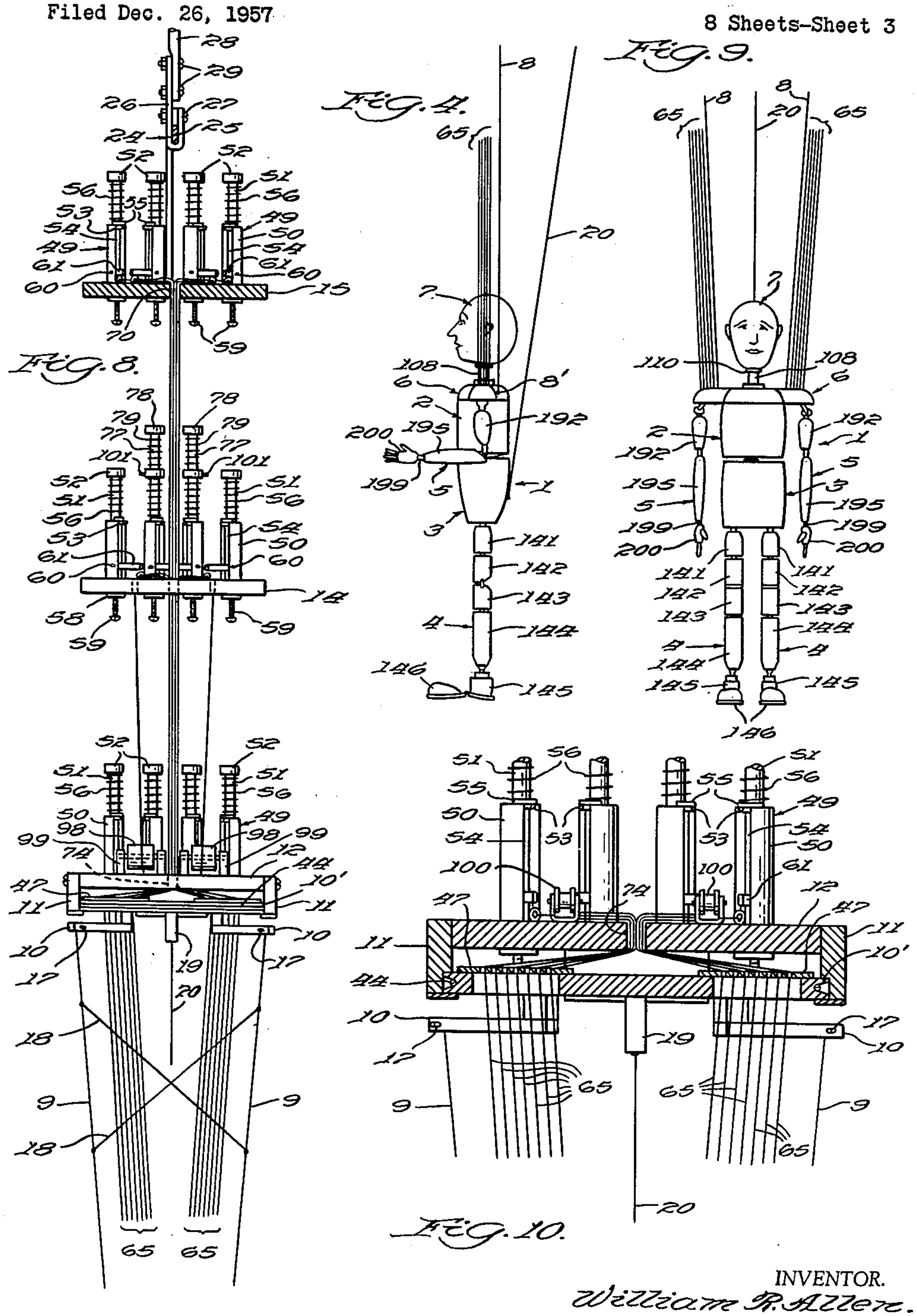

FIG. 2 is an enlarged side elevation of that portion of FIG. 1 above the line A—A of that figure, portions being broken away to permit showing in the enlarged scale, FIG. 3 is an enlarged side elevational view of the keyboard component or assembly of the apparatus, that being the portion between the lines A—A and B—B of FIG. 1, FIG. 4 is an enlarged side elevation of the puppet, that being the portion below the line B—B of FIG. 1, FIG. 5 is a further enlarged medial sectional view of the portion of FIG. 2 indicated by the line 5—5, FIG. 6 is a further enlarged medial sectional view taken on the line 6—6 of FIG. 2, FIG. 7 is a rear elevational view of the keyboard portion of the apparatus which is shown in side elevation in FIG. 3, FIG. 8 is a front elevational view of the keyboard component with a portion thereof being shown in section as indicated by the line 8—8 on FIG. 3, FIG. 9 is a front elevational view of the puppet shown in side elevation in FIG. 4.

Figure 11:
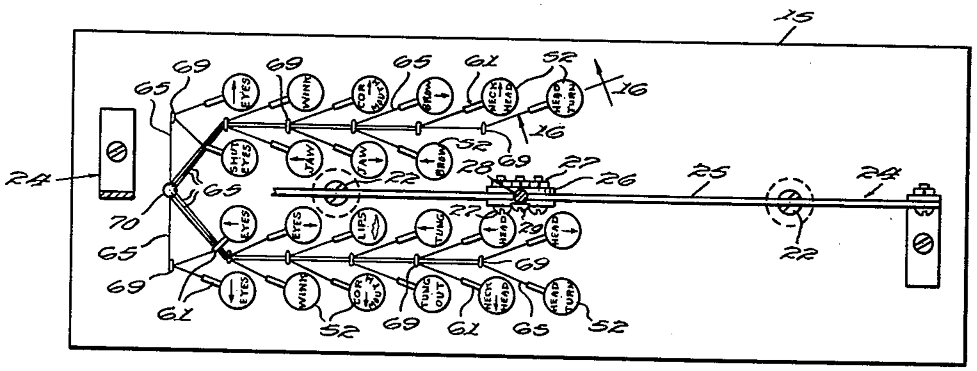
Figure 12:
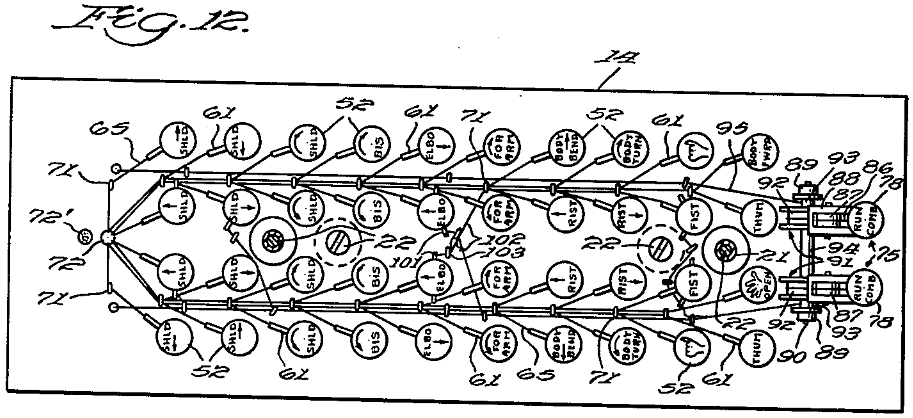
Figure 13:
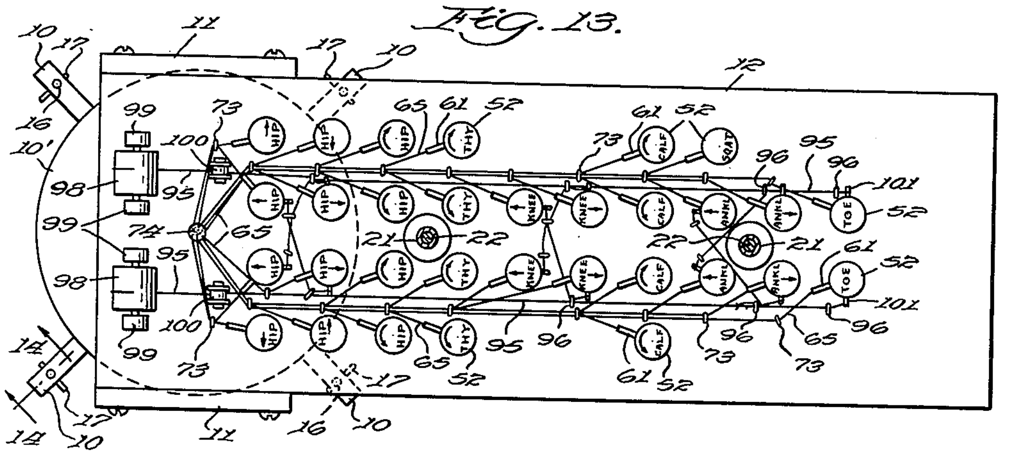
Figure 14:
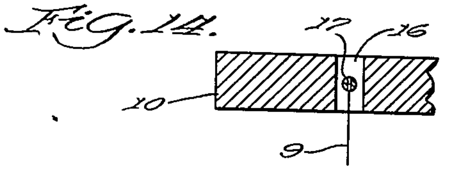
Figure 15:
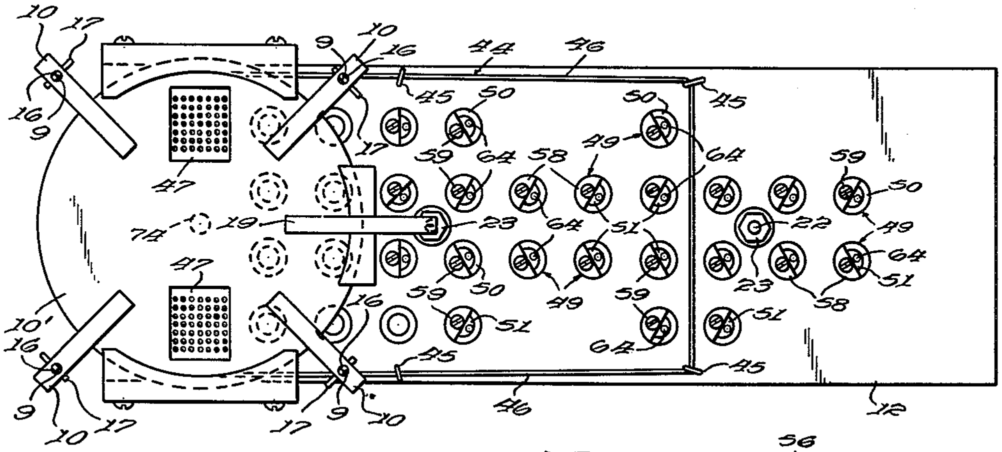
Figure 18:
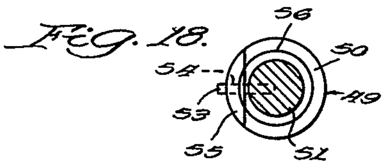
Figure 16:
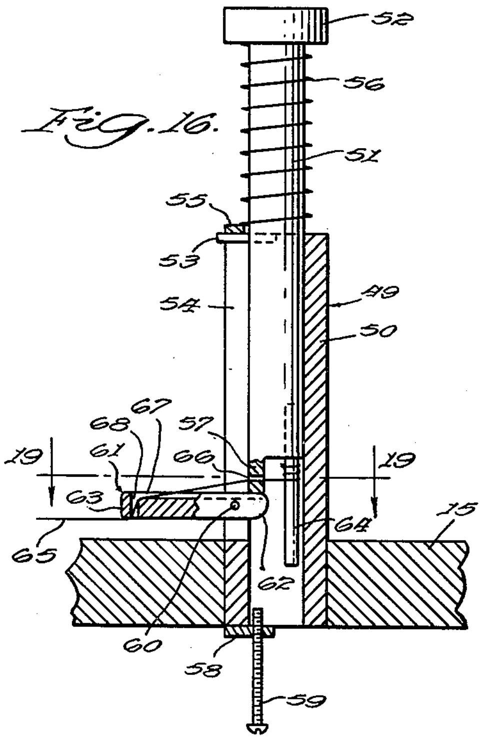
Figure 17:
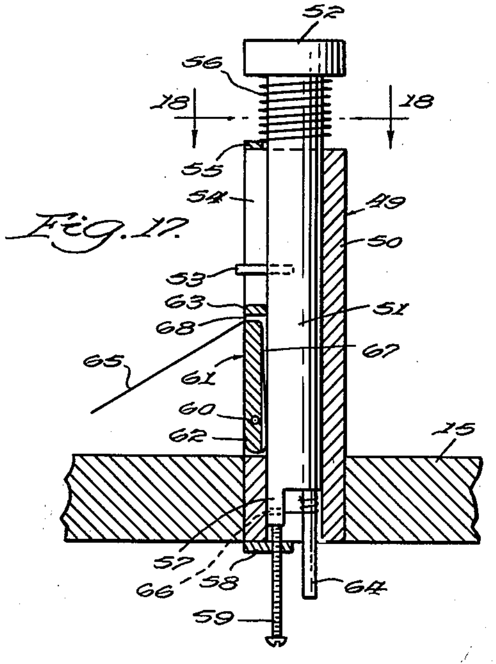
Figure 19:
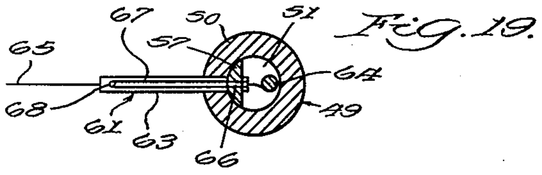
Figure 20:
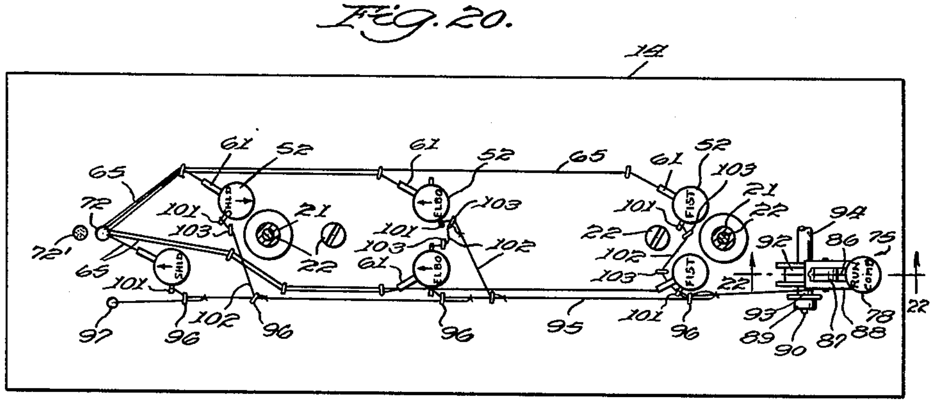
Figure 21:
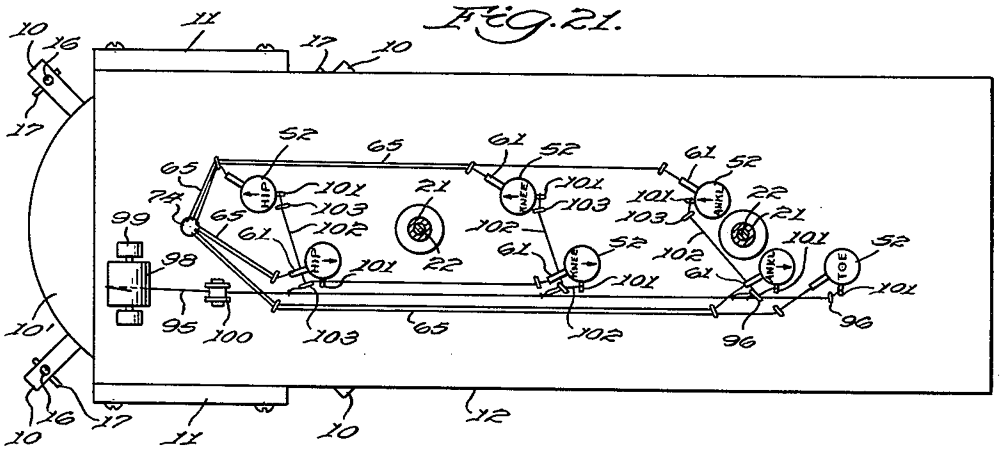
Figure 22:
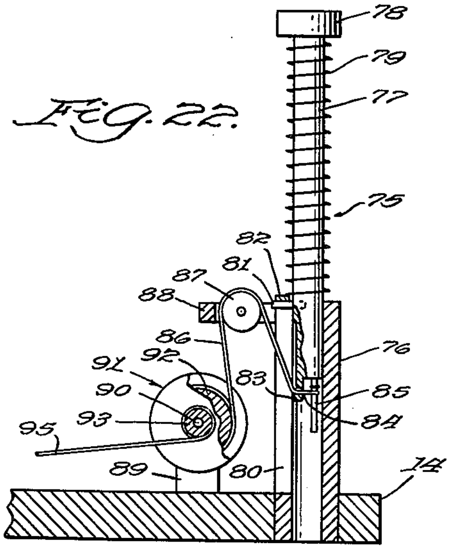
Figure 23:
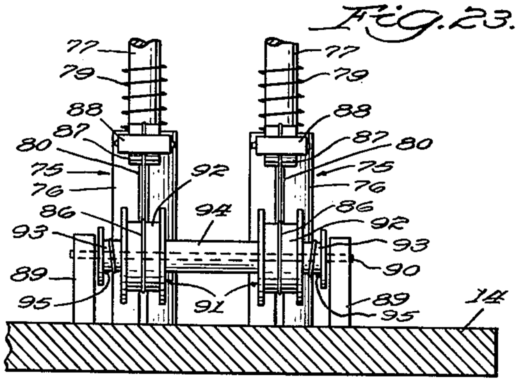

FIG. 10 is an enlarged, fragmentary sectional view taken on the line 10—10 of FIG. 3, FIGS. 11, 12 and 13 are, respectively, top plan views of the upper, middle, and lower keyboards of the keyboard component of the invention, FIG. 14, is an enlarged fragmentary sectional view taken on the line 14, 14 of FIG. 13 and illustrates a takeup means for the puppet supporting harness, FIG. 15 is a bottom plan view of the lower keyboard and of the turntable means carried thereby, FIGS. 16 and 17 are enlarged medial sectional views of one of the operating keys in normal and depressed or actuated positions, respectively, FIG. 18 is a sectional view taken on the line 18—18 of FIG. 17, FIG. 19 is a transverse sectional view taken on the line 19—19 of FIG. 16, FIGS. 20 through 23 relate to a master key means in which:

FIG. 20 is a top plan view of the middle keyboard showing only those keys which are interconnected with one of two master keys connected to certain of the keys on the center keyboard and the lower keyboard to effect a running action in the puppet, the keys not connected to the master key being omitted for clearness, FIG. 21 is a similar view of the lower keyboard and of the keys thereof which are likewise connected for optional actuation by the master key, FIG. 22 is an enlarged medial sectional view of one of the master keys and the key actuating means connected thereto, and FIG. 23 is an enlarged transverse sectional view taken on the line 23—23 of FIG. 3 showing the pair of master keys.

Figures 24, 25, 26, 27:
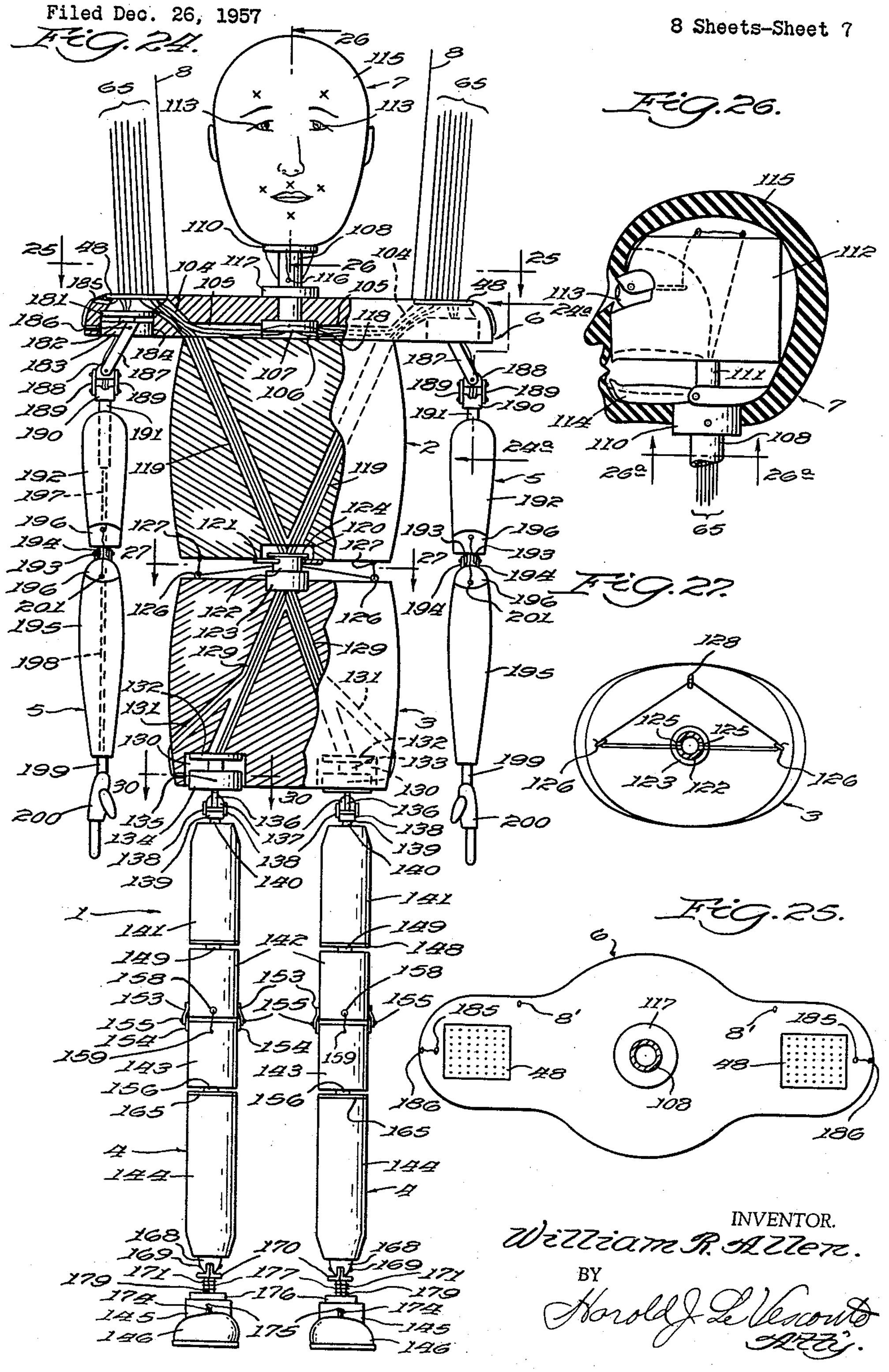
Figures 24A, 25A, 26A, 28, 29, 30, 31, 32:
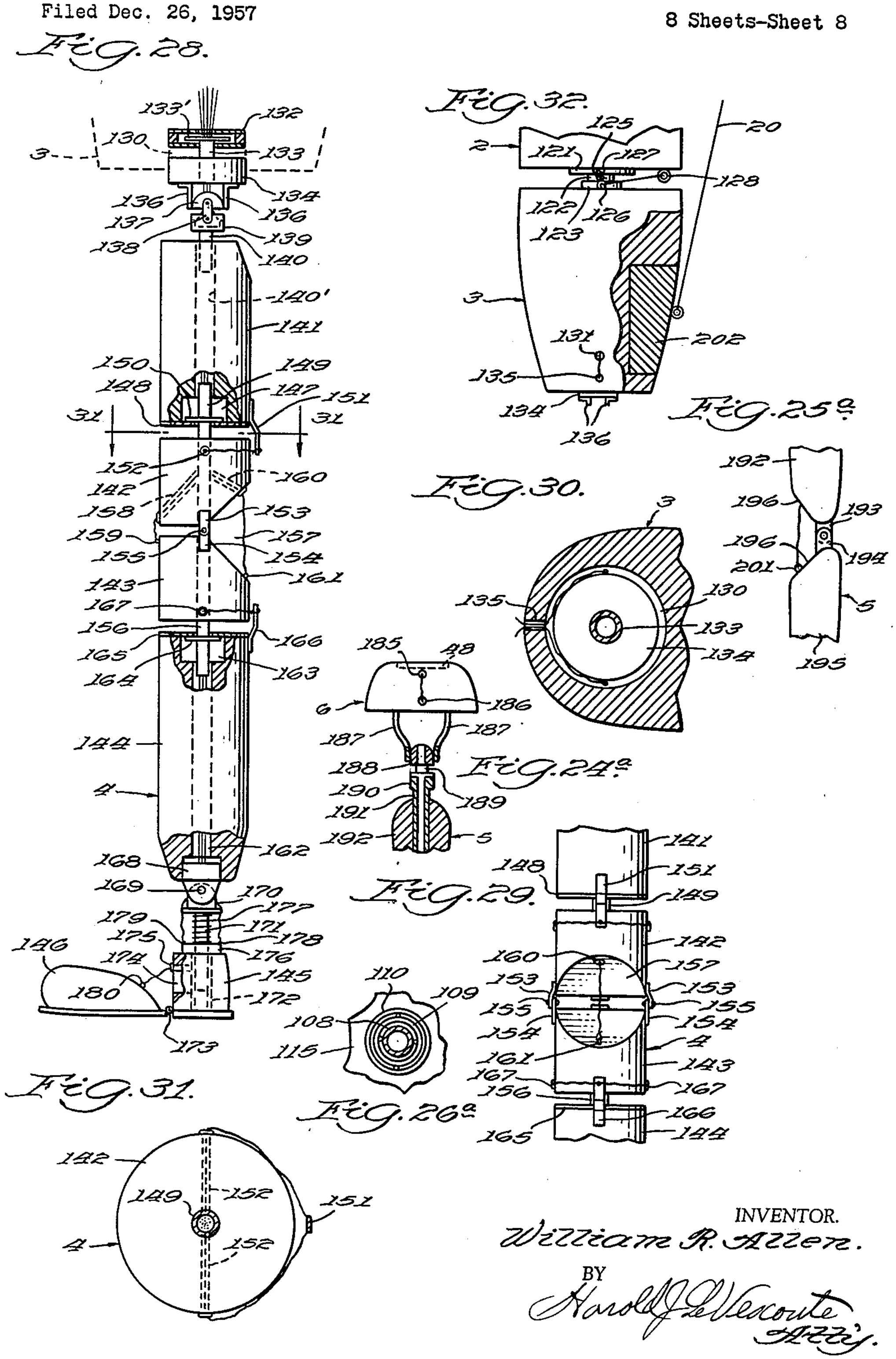

FIGS. 24 through 32 relate to the structure of the illustrated puppet in which:

FIG. 24 is a greatly enlarged front elevational view of the puppet with portions thereof shown in section to disclose details of internal construction, FIG. 24*a* is an enlarged, fragmentary, partially sectional view taken on the line 24*a*—24*a* of FIG. 24.

FIG. 25 is a top plan view of the shoulder element, the view being taken on the line 25—25 of FIG. 24, FIG. 25*a* is an enlarged, fragmentary side elevational view of one of the elbow joint means, FIG. 26 is a medial sectional view of the head, the view being taken on the line 26—26 of FIG. 24, FIG. 26*a* is a sectional view of the head mounting means taken on the line 26*a*—26*a* of FIG. 26, FIG. 27 is a sectional view taken on the line 27—27 of FIG. 24 showing the construction by which a twisting effect of the torso portion of the puppet is achieved, FIG. 28 is an enlarged side elevation of the leg of the puppet, FIG. 29 is an elevational view of the mid portion of the leg as viewed from the right hand side of FIG. 28, FIG. 30 is an enlarged view taken on the line 30—30 of FIG. 24 showing the means for effecting the turning of one leg of the puppet, FIG. 31 is an enlarged transverse sectional view of the puppet leg taken on the line 31—31 of FIG. 28, and FIG. 32 is an enlarged side elevation of the lower portion of the puppet torso partly in section to show the location of a stabilizing weight therein.

For convenience, the invention will be described in three separate sections, viz., the puppet supporting means which includes generally those elements which support the puppet and effect bodily movement of the entire puppet, the puppet actuating means which includes generally the means by which the various elements of the puppet are given their individual movements, and the construction of the puppet itself.

*The Puppet Supporting Means*

The puppet 1 in the illustrated embodiment of the invention is a representation of a human figure. As illustrated, any clothing which might be supplied is omitted and it will be understood that the invention in certain aspects is not necessarily limited to such puppets and that other puppets representing animals or fanciful beings may equally well be employed. The puppet comprises a torso formed of upper and lower sections 2 and 3 having legs 4 and arms 5 appropriately attached thereto, a shoulder element 6 and a head 7. The means by which these members of the puppet are interconnected will be later described in detail. A pair of cords 8, 8 have their lower ends attached to the shoulder element 6 at each side of the head by means of eyelets 8′, 8′ and the upper ends of the cords are attached to the lower ends of a harness means comprising four cords 9 depending one each from one each of a series of radially extending arms 10 carried by a turntable comprising a horizontally disposed disk 10′ mounted for rotation in oppositely positioned guide blocks 11, 11 secured to and extending beneath the front end of the lower keyboard 12 of a puppet actuating apparatus generally indicated at 13 and in addition to the keyboard 12, including the middle keyboard 14 and upper keyboard 15. Each of the arms 10 at the distal end thereof is provided with a vertical hole 16 and extending across the hole is a pin 17 having a friction fit with the arm, said pin at the portion thereof crossing the hole 16 having means for attachment of one of the threads or cords 9. The friction fit of the pin with the arm permits the pin to be turned to wind the cord 9 thereon or to be unwound therefrom to a desired extent to equalize the lengths of the cords to their point of attachment with the cords 8. Diagonally extending and crossing cords 18 between the adjacent ones of the cords 9 complete the supporting harness. The disc 10′ further carries a radially extending arm 19 midway between two of the arms 10 which are connected to one each of the cords 8 and which arm 19 extends toward the rear of the puppet. A cord 20 connects the arm 19 with the rear of the lower torso portion 3 at the rear thereof and serves to support the puppet in forward bending movements. The keyboards 12, 14 and 15 are held in superposed parallel relation by pairs of spacing sleeves 21 through which bolts 22 extend, the bolts also extending through the keyboards at the ends of the sleeves and being secured therein by nuts 23. The upper surface of the upper keyboard 15 carries an inverted U-shaped bail 24 fixed thereto and the horizontal member 25 of the bail carries a clip member 26 mounted thereon with capacity for being clamped thereto at a desired position therealong by screws 27. The clip member 26 carries an upwardly extending rod 28 secured thereto by screws 29 and the rod terminates in a circular head 30 to which the lower end of an inverted cup-shaped member 31 is secured by a rivet 32. The member 31 is provided with a hole 33 in the center thereof and houses the head 34 at the lower end of a rod 35 which extends through the hole 33 thus completing the formation of a swivel joint between the rods 28 and 35

(see FIG. 6). The rod 35 thence extends upwardly and terminates in a head portion 36 in the lower end of an elongated sleeve 37 having an inturned flange 38 at the lower end thereof underlying the head 36, the rod 35 between its ends being provided with a laterally offset portion 39 affording clearance for the corresponding portion of another rod of similar shape supporting another puppet, the offset portions of the rods for any group of puppets having offset portions of decreasing extent so that when any two are brought into proximity, one offset portion will be received within the other. The sleeve 37 at its upper end is provided with a head portion 40 adapted to be held against the under surface of a ceiling member C formed of smooth material such as plate glass whereby the sleeve may be freely slid across the surface of the ceiling incident to traverse of the puppet across a stage or the like with maintenance of the movement in a horizontal direction. The portion of the rod 35 above the laterally offset portion 39 is of a length substantially equal to the length of the sleeve and the interior of the sleeve 37 contains a light compression spring 41 which extends from the upper face of the head 36 to the stem 42 of the head portion 40 which is disposed in the upper end of the sleeve 37 and secured therein by a rivet 43, said spring constantly providing a light upward bias on the sleeve sufficient to keep the head portion 40 thereof in engagement with the ceiling surface while allowing the puppet supporting means to be raised and lowered between the ranges limited by the pulling of the head out of engagement with the ceiling surface and the extent to which it can be raised as determined by the closing of the coils of the spring 41. The upper vertical portion of the rod 35 is of sufficient length to permit this vertical movement. The offset portion of the rod 35 serves another useful purpose in that it provides a handy means of turning the entire supporting apparatus about the axial line of the lower and upper vertical portions of the rod 35.

It is desirable at times to cause the puppet to turn without appreciable movement horizontally. The disc 10′ and the suspension of the puppet from the disc is provided for that purpose. The periphery of the disc 10′ is grooved and a cord belt 44 extends around this groove and thence through eyelets 45 along the side edges of the under face of the keyboard 12 whereby runs 46, 46 of the belt are provided for manipulation of the disc 10′ and resultant turning of the puppet. The disc 10′ is also provided with diametrically oppositely disposed perforated plates 47, 47 through which the control and actuating cords for the puppet extend enroute to corresponding perforated plates 48, 48 in the shoulder piece 6 of the puppet as will be later described in detail, it being sufficient to note at this time that the control cords are maintained in parallel with the supporting cords so that they are in no danger of being snarled or twisted together incident to manipulation of the puppet. The adjustable mounting of the clip 26 on the member 25 of the bail 24 permits the apparatus to be balanced in the suspension thereof from the rod 35.

*The Puppet Actuating Means*

Each of the keyboards serves a particular portion of the puppet. The upper keyboard apparatus is connected to the portions having to do with the head of the puppet and the parts of the head. The middle keyboard apparatus is connected to the torso and arms of the puppet, and the lower keyboard apparatus is connected to the legs and feet of the puppet. Also, so far as is practicable, the right and left sides of the keyboard apparatus are connected to the right and left sides of the puppet.

The principal operating means are the key assemblies and these are identical in construction, one of said key assemblies being shown in enlarged scale in FIGS. 16, 17, 18 and 19, the description of which will serve for all of them.

Referring to those figures, each key assembly 49 comprises a vertically disposed, hollow, cylindrical guide 50 having the lower end thereof fixed in a hole extending through the keyboard with the said lower end flush with the under surface of the keyboard. Slidably mounted in the guide 50 is a cylindrical key 51 which is somewhat longer than the guide and terminates above the guide 50 in an enlarged head portion 52. The key carries a laterally extending pin 53 slidably engaging the slot 54 in the guide 50 and serves to keep the key from turning in the guide. A bar 55 at the upper end of the slot serves to limit the extent of upward movement of the key and a compression spring 56 surrounding the key and reacting between the upper end of the guide 50 and the under face of the head 52 tends constantly to urge the key 51 upwardly to the extent permitted by the bar 55. The lower end of the key is cut away to leave a sector shaped depending portion 57 which is vertically aligned with the pin 53 and the lower end of the guide 50 opposite the portion 57 of the key carries a cross member 58 through which a stop screw 59 extends for movement extent limiting engagement with the end portion 57 of the key.

The slot 54 terminates at about the level of the top surface of the keyboard and adjacent the lower end thereof a cross pin 60 serves as a fulcrum for a cord take-up and puppet actuating lever 61 disposed in the slot 54. Normally, the key is elevated by the spring and in the elevated position the portion 57 is above the plane of the lever which is then in a horizontal position (see FIG. 16) with the short end 62 of the lever extending into the path of the portion 57 of the key as it descends and the longer end 63 extending radially outwardly from the guide 50. The upper surface of the cut away portion at the lower end of the key is provided with an upwardly extending hole in which a pin 64 is inserted with a tight friction fit. An operating cord 65 has one end thereof affixed to the pin and thence extends through an eyelet 66 in the portion 57 of the key, thence along a groove 67 in the edge of the lever 61 which is the top edge when the lever is horizontal and thence through an eyelet 68 at the distal end of the end portion 63 of the lever and thence through guiding means to be presently described to some portion of the puppet to be actuated thereby. The friction fit of the pin 64 in the key permits the pin to be rotated to adjust the final length of the cord attached thereto.

Normally, the parts are in the position shown in FIG. 16 and when the key is depressed, the lever is moved clockwise as viewed in FIG. 17 until it is vertical in the slot 54. In so moving, the downward movement of the key and the tilting movement of the lever takes up the cord attached thereto the extent allowed by the adjustment of the stop screw 59. When the key is released, the spring lifts the key and the pull on the cord by the portion of the puppet to which it is attached brings the lever back to horizontal position. It is to be noted that depressing the key serves to lock the lever in the vertical position with the groove 67 serving to house the cord against frictional engagement with and breaking by the key. It is also to be noted that each key assembly is circular in cross section and consequently may be positioned at any desired angular position in the holes therefor in the keyboards.

The top surfaces of the various keys are each labeled to indicate the portion of the puppet actuated thereby, the designations shown in FIGS. 11, 12, and 13 being representative. Considering first FIG. 11 there are keys provided for various movements of the eyes and eyelids, the jaw, the mouth and lips and the head. Since the space is limited, it is convenient to indicate the type and direction of movement by arrows. It will be noted that all of the cords from the various keys are guided through eyelets 69 arranged in parallel lines between the two rows of keys at each side of the longitudinal center line of the keyboard and that at the forward end of the keyboard 15 the various cords are directed downwardly through a hole 70.

The keyboard 14 in the illustrated embodiment of the invention carries the keys which control the movements of the torso and arms of the puppet and are generally arranged for connection to the right and left sides of the various parts to be controlled. As in the keyboard 15 the key assemblies are arranged in pairs of rows with the levers of the keys of each pair of rows angularly converging and with cord guiding eyelets 71 directing the various cords to a hole 72 in the longitudinal center line of the keyboard 14 and vertically aligned with the hole 70 in the keyboard 15, the cords from the keyboard 15 being routed through a hole 72′ forwardly of the cords from the keyboard 14.

Similarly, the various key assemblies mounted on the keyboard 12 are connected for actuation of the legs and feet of the puppet, the key assemblies being arranged in pairs of rows and the cords therefrom being guided by eyelets 73 to a hole 74 which is vertically aligned with the holes 70 and 72 and through which all of the cords from all of the key assemblies pass and upon leaving the said hole 74 are led to appropriate ones of the perforations in the plates 47 in the disc 10′ and thence to corresponding perforations in the plates 48 carried by the shoulder piece 6 of the puppet and finally through the puppet to the points of connection therewith.

In certain actions of the puppet, as for example, running or walking, it is desirable to connect certain of the key assemblies for co-ordinated action derived from a master key means. A representative master key arrangement for effecting a running action of the puppet is shown in FIGS. 3, 12 and 20 through 23. In the illustrated embodiment of this phase of the invention, the keyboard 14 at the rear end thereof carries a pair of master key assemblies 75, 75 connected by means to be presently described for imparting movements to the puppet in simulation of running when the master keys are depressed and released in alternation. Each master key assembly comprises a vertically disposed tubular guide member 76 mounted in the rear end of the keyboard 14 and in which a cyclindrical key 77 is slidably mounted, said key having a head 78 at the upper end thereof and being normally urged upwardly by a compression spring 79 surrounding the key and reacting between the upper end of the guide 76 and the under side of the head of the key 77. The side of the guide 76 is provided with a longitudinal slot 80 extending from the upper end of the guide to the plane of the top surface of the keyboard and the key carries a laterally extending pin 81 slidable in said slot and operative to prevent turning of the key in the guide. A bar 82 mounted on the upper end of the guide and bridging the slot 80 limits the extent of upward movement of the key by engagement with the pin 81 and the top surface of the keyboard 14 similarly limits downward movement of the key.

The lower end of the key is cut away to leave a depending portion 83 sector shaped in cross section having a cord guiding eyelet 84 extending therethrough. The upper surface of the said cut away portion of the key is provided with an upwardly extending bore in which a pin 85 is tightly frictionally engaged. One end of a pulley operating cord 86 is fixed to the pin and the cord thence extends through the eyelet 84 and thence through the slot 80 and over a roller 87 carried by a bracket 88 fixed to the upper end of and extending forwardly of the guide 76. Mounted on the keyboard 14 slightly in front of and laterally outward of the master key assemblies are aligned supporting blocks 89, 89 in and between which a shaft 90 is mounted, said shaft extending above the keyboard and transversely thereto. Loosely mounted on the shaft 90 adjacent one each of the blocks 89 is one each of a pair of stepped pulleys 91, 91 disposed with the large diameter portion 92 thereof opposite the guides 76 in a line parallel to the length of the keyboard and with the small diameter portion 93 thereof at the side thereof adjacent the supporting block. A sleeve member 94 mounted on the shaft 90 serves to maintain the pulleys seperated from each other and in the said positions relative to the respective guides. The other end of each of the pulley operating cords 86 is fastened to each of the large pulley portions in such position that when the key 77 is depressed the pulley will be rotated in a counterclockwise direction as viewed in FIG. 22, the extent of downward movement of the key being limited by engagement of the pin 81 with the top surface of the keyboard 14. As in the case of the operating keys 51, rotation of the pin 85 serves as an adjusting take-up for the cord 86.

Each of the small diameter portions 93 of the pulleys 91 has one end of one each of the pair of key operating cords 95, 95 attached thereto to be wound thereon when the pulley is rotated by the operating cord incident to pressing downwardly on one of the master keys 77. The means of connecting one of these operating cords to the keys to be operated thereby is illustrated in FIGS. 20 and 21, it being understood that the other operating cord is similarly connected to the opposite ones of the keys. FIG. 20 shows the operating connections on the keyboard 14 for the master key on the right hand side as viewed from the front end of the keyboard. The cord 95 extends from the pulley portion 93 forwardly along the keyboard slightly to the outside of the operating cords 65 and is guided in a series of eyelets 96 carried by the keyboard. At the forward end of the keyboard, the cord is led through a hole 97 in the keyboard and thence extends downwardly around and beneath a pulley 98 mounted in a bracket 99 on the forward end of the keyboard 12 and thence continues past a guiding pulley 100 rearwardly along the top surface of the keyboard 12 to the rear end of the keyboard 12 and from the rearmost of said eyelets 96 the cord extends upwardly and is secured to a pin 101 extending laterally from the head 52 of one of the keys 51 carrying the indicia "toe." Being on the right hand side of the keyboard, the operating cord actuated by downward movement of that key will be connected to the toe portion of the right foot of the puppet. Enroute along the path of the key operating cord it is connected by branch cords 102 leading through guiding eyes 103 to similar pin elements 101 extending from the heads of certain of the keys 51. Thus depressing one of the master keys will pull the connected key operating cord by causing it to be wound on the pulley to which it is connected and by such movement to pull the connected ones of the keys 15 downwardly and thus actuate a plurality of portions of the puppet simultaneously. Specifically, and referring to FIGS. 20 and 21, depressing the right hand master key 77 in addition to operating the right hand toe portion of the puppet will cause the following actions reading from the master key forwardly along the keyboard 14 and then rearwardly along the keyboard 12, closure of both the right hand and left hand fists, upward movement of both forearms at the elbow, forward movement of the right shoulder and simultaneous rearward movement of the left shoulder, forward movement of the left hand hip, knee and ankle and rearward movement of the left hand hip, knee and ankle. It will be obvious that other master keys can be similarly added and appropriately connected with the puppet actuating keys and that the two master keys illustrated may be similarly connected to others of the puppet actuating keys for other actions of the puppet. It is particularly to be noted that the cords 65 are separately guided through the disc 10 and the puppet suspending cords 8 and 9 move with the disc as it is turned and, therefore, the cords 65 and the suspending cords are maintained in their relative positions to each other as the disc is turned with resultant preservation of the operative integrity of the puppet control means by the cords 65.

*The Puppet*

Referring principally to FIGS. 24 through 32, a representative puppet is illustrated, the puppet being a representation of a human figure. The head 7 is monuted on the shoulder piece 6 and the arms and the torso with the legs are suspended from the shoulder piece which, in turn is suspended by the cords 8, 8 as previously described. The groups of the operating cords 65, 65 enter the puppet through the openings in the guide plates 48, 48 and thence are routed to the various portions of the puppet through means and for purposes to be described. The shoulder piece 6 is rigidly mounted on the upper torso member 2 and the combined elements are designated "shld" on the actuating keys therefor. The lower portion 3 of the torso is designated "hip" on the keys connected thereto. The other key designations are believed to be self-explanatory.

Referring first to FIG. 24, the shoulder piece is provided with downwardly and laterally inwardly extending channels 104, 104 extending from the under side of the plates 48, 48 to the under side of the shoulder piece and connecting with grooves 105, 105 extending longitudinally of the shoulder piece at the lower face thereof from the grooves 104 to a vertically disposed circular recess 106 at the center of the shoulder piece. Fixed in the recess 106 is a flange 107 carried by an upwardly extending tube 108 which extends through the shoulder piece and at its upper end is connected by an interposed gimbal ring 109 to the inner surface of a depending annular flange 110 carried at the lower end of a vertical tube 111 disposed above and in axial alignment with the tube 108. The upper end of the tube carries a hollow block 112 in which the eyes 113 of the puppet are mounted and to which the lower jaw 114 is hingedly mounted and the block is covered with a resilient cover 115 formed of material such as soft rubber having the outer contour and color of the face of the character represented by the puppet, the cover being adhesively attached to the block at points only. Certain of the control or actuating cords 65 are led through the channels 104 and the grooves 105, which by reason of the attachment of the shoulder piece to the upper torso member are also enclosed channels, and are thence led up through the tubes 108 and 111 and are attached to the eyes, the eyelids, and the lower jaw of the puppet. Others of the cords 65 extend through holes in the surface of the block 112 and are attached to various points of the inner surface of the cover material 115 as indicated, for example by the points marked "*x*" around the mouth and above the eyes in FIG. 24, the lead of the cords to the said points of attachment being such as to distort the cover in desired directions in the simulation of speaking or other facial expressions. Four of the cords 65 are lead through holes 116 in the tube 108 and are attached to the flange 110 at points opposite the pivot points of the gimbal ring and thus upon pulling of appropriate ones of the keys operate to incline the head backward and forward as well as from side to side or in any combination of such movements. The tube 108 is loosely mounted in the shoulder piece and at the top surface of the shoulder piece carries a collar 117 which holds it against endwise movement. The flange 107 is slightly smaller than the recess 106 and two of the cords (one from each side) are attached to the flange 107 at diametrically opposite points as at 118 and are thereby enabled to effect turning of the head.

The upper torso portion 2 is rigidly attached to the under face of the shoulder piece 6 and is provided with downwardly converging passageways 119, 119 leading from the juncture of the channels 104 with the grooves 105 to a circular recess 120 in the under face of the torso portion 2 at the vertical centerline thereof. A washer 121 is fixed to the underside of the torso portion 2 with the inner edge thereof overlapping the edge of the recess 120 and loosely surrounding a tube 122 carried by a collar member 123 mounted in the upper end of the lower torso portion 3, said tube within the recess 120 carrying a lateral flange 124 engaging the upper face of the washer 121 and thus connecting the torso portions 2 and 3 with capacity for turning and bending movements. The cords for the control of the motions of the lower torso portion and of the legs and feet are led through the tube 122 and the cords which produce the motions between the torso portions are led through openings 125, 125 in the sides of the tube 122 and are led to eyelets 126, 126 in the upper face of the lower torso portion adjacent the sides thereof. One cord at each side is thence attached to one each of a pair of eyelets 127, 127 on the under face of the upper torso portion substantially directly above the eyelets 125, 125; said cords upon actuation by the keys to which they are attached being effective to effect a body bending motion to either side. Two other two cords are led to the rear and are attached to an eyelet 128 carried by the under face of the upper torso portion and said cords are effective to produce a turning effect between the torso portions.

The lower portion 3 of the torso is provided with a pair of cord guiding channels 129, 129 which at their upper ends communicate with the lower end of the tube 122 and thence extend diagonally downwardly to the cylindrical hip joint recesses 130, 130 in the lower face of the torso member 3. The torso member 3 is also provided with branch channels 131, 131 which extend from about the mid length of the channels 129, 129 to the sides of the torso slightly above the lower end thereof, said branch channels serving to guide the cords for effecting turning actions of the hip joints as will be later described. It will be noted that rocking and turning movements between the upper and lower torso portions can have little, if any, effect on the control cords thus passing through the central point formed by the tube 122.

Secured in the end face of each hip joint recess 130 is a washer assembly 132 comprising a pair of washers which are held in spaced parallel relation by an interposed ring, the lowermost washer having the upper end of a tube 133 extending loosely therethrough and said tube having a laterally extending flange 133' disposed between the washers and preventing the tube from being withdrawn therefrom while permitting free turning movement of the sleeve and limited rocking movement in all directions, the tube 133 being in communication with the channel 129 and serving to guide the appropriate control cords from the torso to the leg assembly. The lower end of the tube 133 carries a disk member 134 which is freely rotatable in the recess 130. A pair of operating cords for turning the leg assembly 4 at the hip joint extend from the channel 129 and branch channel 131 to the outside of the torso portion and are thence conducted through an opening 135 in the side of the torso to the recess 130 and thence extend between the disk 134 and the side wall of the recess to diametrically opposite points at the front and back of the disk, whereby upon actuation of one or the other of the cords by the key to which it is connected, the leg assembly will be caused to turn in the desired direction.

The under face of the disk 134 carries spaced depending brackets 136, 136 which are connected by spaced bridging members 137, 137 and links 138, 138 depending from the bridging members connect the bridging members to the head 139 carried by a tube 140 mounted in the upper end of the axial bore 140' extending through the thigh portion 141 of the leg assembly 4. In addition to the thigh portion, the leg assembly includes the upper and lower knee portions 142 and 143, the calf portion 144 and the foot assembly comprising the portion 145 and the toe portion 146, together with the means by which the said portions are interconnected to each other and to the control cords to be described in more detail.

The lower end of the bore 140' terminates in a counterbore 147 at the lower end of the thigh portion 141 and said counterbore is covered by a plate 148 having an opening therethrough in line with the bore 140' through which the upper end of a tube 149 extending axially through the upper knee portion 142 extends, said tube adjacent to said upper end thereof carrying a radially extending flange 150 disposed above the plate 148 and therefore within the counterbore 147. Thus the plate serves to maintain the thigh and upper knee portions connected with capacity for slight relative axial movement and for turning movements about the axial line of the leg assembly. The lower end of the thigh portion at the rear thereof carries an arm member 151 extending downwardly past the upper end of the upper knee portion, said arm being bent slightly outwardly to be spaced from the upper knee portion. The tube 149 adjacent to the upper end of the upper knee portion is provided with diametrically opposite openings in the side walls thereof which communicate with radially extending passages 152 in the upper end of the upper knee portion and two of the control cords extending from appropriate keys extend out of these passages and are attached to the free end of the arm 151 whereby actuation of one or the other of the keys will effect turning of the upper knee portion and the portions of the leg assembly depending therefrom in a desired direction about the axis of the thigh portion.

The sides of the adjacent ends of the upper and lower knee sections are provided, respectively, with depending and upwardly extending members 153 and 154 which are connected by rivets 155 to form spaced, aligned hinges arranged to hold the said portions spaced apart. The tube 149 terminates slightly below the lower end of the upper knee portion and the lower knee portion 143 carries a tube 156 axially aligned with the tube 149 and extending slightly above the upper end of the said lower knee section and operative to conduct control cords received from the tube 149 through the lower knee portion. The adjacent faces of the knee portions at the rear thereof are cut away at approximately a 45° angle to form a clearance space 157 to allow the lower knee portion to be swung about the connecting hinge means to somewhat more than a right angle, the longitudinal spacing of the portions from each other increasing the extent of movement permitted by the said clearance space. Below the passageways 152, the upper knee portion is provided with a downwardly and forwardly extending passage 158 which emerges slightly above the lower end of the said portion and which at its other end communicates with an opening in the side of the tube 149. A control cord extents from a key on the keyboard tnrough the puppet and finally through the passage 158 and is attached to an eye 159 at the front portion of the lower knee portion and is therefore operative upon depressing the key to bring the knee portions into alignment. The upper knee portion is further provided with a seond passage 160 leading diagonally downwardly and rearwardly from an opening in the tube 149 opposite the opening communicating with the passage 158 and through which a control cord extends and is attached to an eye 161 carried by the lower knee portion at the rear thereof, said cord upon actuation by its key serving to swing the lower knee portion, the calf portion and the foot rearwardly about the axis of the hinge pins 155.

The calf portion 144 has an axial bore 162 extending therethrough and with a counterbore 163 at the upper end thereof. The tube 156 carried by the lower knee portion extends downwardly below the lower end thereof and into the counterbore 163 and within the counterbore carries a flange portion 164 which is overlain by the plate 165 secured to the upper end of the calf portion and through an opening in which the tube 156 extends into the counterbore. This construction is identical with that between the upper knee portion and thigh portion except for being inverted. The upper end of the calf portion 144 at the rear thereof carries an arm member 166 which extends upwardly and rearwardly spaced from the lower end of the lower knee portion and the lower knee portion is provided with laterally opposite passages 167 corresponding to the passages 152 which communicate with openings in the tube 156 and through which control cords extend and are secured to the free end of the arm 166 to effect turning of the calf portion relative to the lower knee portion.

Fixed to the lower end of the calf portion 144 is a yoke member 168 having an opening in the base thereof in communication with the bore 162 and through which the various cords for controlling the foot assembly pass. Pivotally connected to the yoke 168 by a pin 169 is the head 170 of a tube 171 which thence extends downwardly into and has sliding engagement with a tube 172 carried by the heel portion 145 to which the toe portion 146 is pivotally connected at 173. The tube 172 has a vertical slot 174 at the forward side thereof and the tube 171 carries a small laterally extending tube 175 slidably engaging this slot and serving to limit the extent of sliding movement and to prevent relative rotation between the tubes 171 and 172. The tube 172 at the upper end thereof carries a collar 176 and a spring 177 surrounding the tube 171 and reacting between the head 170 and the collar 176 tends constantly to urge the foot assembly away from the calf portion to the extent permitted by the tube 175 in the slot 174. Two control cords extend through the calf portion and are attached to the front and rear of the head 170 as at 178 and 179 to give the ankle motions to the foot and another cord extends through an opening in the head 170 into the tube 171 and thence through the tube 175 and is attached to the toe portion as at 180 to lift the toe about the hinge 173.

While in general the foregoing description of the leg construction has been confined to one leg, it will be understood that the legs being identical, the description of one will serve for both. The same principle applies to the description of the arm structure which follows.

Each arm is supported by a swivel mounting which is like that employed at each hip and comprising a washer and ring assembly 181 which corresponds to the washer and ring assembly 132 within which the flanged end of a depending tube 182 is loosely mounted, said tube at its lower end carrying a disk 183 and the entire assembly being housed in a cylindrical recess 184 in the under face of the shoulder piece 6 with the disk having sufficient clearance in the said recess for free rotation therein, the washer assembly 181 being secured in the end of the recess. The recess 184 is disposed directly beneath the plate 48 and control cords for the arm and hand are led directly from the openings in the plate into and through the tube 182. Two of the control cords are led through a passage 185 to the end of the shoulder piece near the upper surface thereof, thence downwardly across the end of the shoulder piece and thence through a passage 186 leading into the lower portion of the recess 184, the cords being then attached to the disk 183 at the front and back thereof in the same manner as illustrated in FIG. 30 whereby by actuation of one cord or the other the disk can be rotated.

The disk 183 carries a pair of spaced, parallel arms 187, 187 carrying a block 188 hinged therebetween, said block having a vertical bore therethrough in alignment with the tube 182. Links 189, 189 hingedly connect the block 188 to the head 190 of a tube 191 extending axially from the upper end of the upper arm portion 192 of the arm assembly 5, the links being disposed radially between the hinged mounting of the block 188 on the arms 187 and the interior of the tube 191 being in alignment with the hole in the block 188 to receive control cords therefrom for guidance through the said upper arm portion and the said hinged connections between the upper arm portion and the disk 183 affording freedom for universal movement. Spaced, aligned hinges comprising the members 193, 193 projecting from the upper arm portion 192 and complementary members 194, 194 projecting from the adjacent end of the forearm portion 195 connect the arm portions, the adjacent ends thereof being cut away as at 196 to provide the necessary clearance. The tube 191 communicates with a bore 197 extending axially of the upper arm portion 192 as an extension thereof and the forearm portion 195 is likewise provided with a longitudinal bore 198 which terminates in a tube 199 which carries the hand assembly 200. The said tubes and bores serve to conduct the various control cords received through the shoulder joint assembly to the various parts of the arm and hand assembly to be actuated thereby. One of the said cords emerging from the bore 197 is attached to the end of the upper arm portion as at 201 and operates to bend the arm at the elbow. Another cord, not shown, operates at the rear of the elbow to move the forearm in the opposite direction in the same manner as the cord at the front of the knee joint operates.

Referring finally to FIG. 32 there is shown the provision for insuring that when the puppet is caused to bend at the waist and hips as by lowering the keyboard assembly, a natural action will be achieved. The rear of the lower torso member 3 is provided with a weight 202 embedded therein and to which the cord 20 is attached. When the puppet is to be caused to bend by the forward tipping of the keyboard assembly the weight 202 will maintain the cord 20 taut and thus the puppet will lean forward as in bowing, for example. The weight would be in the position shown for puppets representing persons and for those representing animals the corresponding weight would be located at a point in the puppet best adapted to retain the posture of the puppet.

In the foregoing description, in the interest of avoiding needless repetition, the tracing of the path of each of the many operating cords from the exact operating key to the connection to the particular portion of the puppet has been omitted, it being deemed sufficiently obvious that each cord is actuated by one of the keys and that provision is made in the structure of the illustrated puppet to route the various cords to various portions of the puppet to be actuated thereby and it will be understood that the principles disclosed in the described embodiment can be equally well applied to puppets of either less or greater complexity than the said example and which may simulate an animal or a fanciful being. The fact that selected ones of the operating keys can be connected for operation by master keys has already been referred to.

Accordingly, the invention is not to be deemed to be limited to the exact embodiment thereof thus disclosed by way of example, and it will be understood that the invention includes as well all such changes and modifications in the parts, and in the construction, combination and arrangement of parts as shall come within the purview of the appended claims.

I claim:

1. A puppet device including an operating keyboard and a puppet representing a human figure comprising a plurality of rigid elements interconnected and generally simulating the various movable portions of the human body, but differing in the provision of a torso portion comprising upper and lower portions interconnected with capacity for relative rocking movement in all directions and for limited relative rotational movement about a point in a line extending generally centrally longitudinally of the torso portion, means for producing desired relative movement between said torso portions including a plurality of cords extending between said torso portions and having one end of each cord attached to one or the other of said torso portions and thence extending through the shoulders of the puppet to one each of a plurality of optionally, separately manually operable actuating keys carried by said operating keyboard, other cords connected to other keys on said keyboard and to elements of said puppet below said torso portions extending through said torso portions, means for guiding said last named cords through said point and flexible means separately suspending said puppet from said keyboard.

2. A puppet as claimed in claim 1 in which a head portion is mounted on the upper end of the upper torso portion for independent rotational and rocking movements and in which other cords extend from the interior of said head laterally internally of the puppet and emerge from the puppet through the shoulders thereof and thence extend to other similarly optionally manually operable actuating keys of said keyboard.

3. In a puppet and operating means therefor a puppet comprising a plurality of rigid members articulately interconnected to form a resemblance of a human figure and operating means for said puppet comprising a keyboard means having a plurality of separately, optionally manually operable keys each attached by a cord to a portion of the puppet to be actuated thereby and means for turning said puppet relative to said operating means comprising a turntable carried by said operating means, cords connecting diametrically opposite points of said turntable with the puppet, cord operating means carried by said turntable at diametrically spaced points through which said operated cords extend to corresponding portions of said puppet, and means for moving said turntable about a vertical axis.

4. In combination, a puppet comprising a plurality of rigid, articulately interconnected parts including right and left legs and each of said legs including components articulated at the hip, knee and ankle, and an operating means therefor comprising a keyboard having pluralities of right hand and left hand manually operable keys, a plurality of operating cords separately connecting one each of said keys to one each of the parts of the component parts of said legs of the puppet to be operated by the key to which the cord is attached, means for achieving simulation of locomotion by the puppet comprising a right hand master key means and a left hand master key means, means operatively connecting said right hand master key means to the cords of those operating keys controlling puppet leg movements incident to forward movement of the right leg of the puppet for simultaneous movement of said cords, and other means operatively connecting said left hand master key means to the cords of those operating keys controlling puppet leg movements incident to forward movement of the left leg of the puppet for simultaneous movement of said last named cords, whereby, alternate operation of said master keys effects simulation of locomotion by said puppet.

5. A puppet comprising a plurality of rigid articulated members and having a series of controlled cords internally thereof, each of said cords having an end thereof attached to one each of said members at a point thereon to effect a desired movement of that member by tension applied to the cord; said cords entering said puppet through individual guiding eyes grouped at the upper right and left hand surfaces of the puppet from manually controlled operating means for the individual cords; said puppet being in the form of a simulation of a human figure, one of said articulated members comprising a head portion comprising rigid, articulated frame members covered by a resilient material having an outer surface representing a human face; said resilient covering being attached to said rigid frame members at spaced points only, said rigid frame members of said head including a hollow neck portion mounted on the body of the puppet for relative angular and rotational movement, and means for imparting facial expression to the puppet in all angular and rotational positions of said head; said means comprising a plurality of said cords entering the body of the puppet through certain ones of said individual guiding eyes and thence extending upwardly through said hollow neck portion and being attached to various portions of the inner surface of said resilient covering portion for said head.

6. A puppet and actuating means as claimed in claim 5 in which said manually controlled operating means includes keyboard means divided into right and left hand portions with the key devices of said portions connected by said controlled cords to the puppet members to be actuated thereby at the corresponding sides of the puppet.

7. A puppet and actuating means therefor as claimed in claim 5 in which said manually controlled operating means includes a keyboard means having reciprocable keys connected to said controlled cords, said keyboard means further having at least one master key connected to selected ones of said keys for simultaneous operation of said selected keys.

8. In a puppet apparatus, a puppet having rigid articulated members, a puppet actuating means comprising a keyboard means having a plurality of separately manually operable puppet member actuating devices each separately connected to separate portions of the puppet members to be actuated by the individual devices and each of said devices including a manually engageable operating key and a member operating cord extending from the portion of the puppet member to be actuated to the associated key, a separate means for suspending said puppet at a fixed distance below and from said keyboard means, and manually operable means for moving said puppet suspending means and said puppet as a unit in turning movements relative to said keyboard means in either direction about a vertical axial line while preserving the operative integrity of the puppet member actuating devices.

9. In a puppet apparatus, a puppet having rigid articulated members, a puppet actuating means comprising a keyboard means having a plurality of separately manually operable puppet member actuating devices each separately connected to separate portions of the puppet members to be actuated by the individual device and each device including a manually engageable operating key and a member operating cord extending from a portion of the puppet device actuated by the associated key to the puppet member to be actuated in response to manual actuation of the key, a separate means for suspending said puppet at a fixed distance below and from said keyboard, and manually operable means for moving said puppet suspending means and said puppet as a unit relatively to said keyboard means in either direction about a vertical axial line while preserving the operative integrity of the puppet member actuating devices; said puppet including a head portion, a torso and arm portion, and a leg portion, and said keyboard means comprising three rigidly interconnected keyboards each having a plurality of said key devices including reciprocable keys and in which the key devices of one each of said keyboards are connected to the ones of said puppet members comprising one each of said portions of said puppet, respectively.

10. In a puppet apparatus, a puppet having rigid, articulated members and at least one flexible, resilient member forming a relatively movable surface for a portion of at least one of said rigid members, a puppet actuating means comprising a keyboard having a plurality of separately manually operable actuating devices each separately connected to separate portions of a puppet member, including said resilient member, to be actuated by the individual device and each device including a manually engageable operating key and a member operating cord extending from a portion of the device actuated by the associated key to the puppet member to be actuated in response to manual actuation of the key, a separate means for suspending said puppet at a fixed distance below and from said keyboard, and manually operable means for moving said puppet suspending means and said puppet as a unit relatively to said keyboard means in either direction about a vertical axial line while preserving the operative integrity of the puppet member actuating devices.

11. A puppet apparatus as claimed in claim 10, in which each of said actuating devices includes a vertically disposed cylindrical guide mounted in the keyboard, each of said keys comprises a manually depressible cylindrical plunger freely reciprocable in said guide, spring means tending constantly to move said plunger upwardly in said guide, interengaging means between said plunger and said guide effective both to prevent relative rotation of said plunger in said guide and to limit the extent of said reciprocable movement of said plunger, means for attaching one end of a puppet member operating cord to said plunger, means for multiplying the extent of operating cord movement derived from downward movement of said plunger comprising a lever mounted on said guide and having a camming surface at one end disposed in the downward path of movement of said plunger and having an eye at the other end thereof through which said cord is trained en route from its point of attachment to said plunger to the puppet member to be actuated thereby.

References Cited in the file of this patent

UNITED STATES PATENTS

| | | |
|---|---|---|
| 1,489,385 | Ciavatti | Apr. 8, 1924 |
| 1,721,091 | Ritchie et al. | July 26, 1929 |
| 1,790,743 | Christensen | Feb. 3, 1931 |
| 1,974,366 | Pollock | Sept. 18, 1934 |
| 2,136,500 | Griese et al. | Nov. 15, 1938 |
| 2,570,737 | Whitcomb | Oct. 9, 1951 |
| 2,632,337 | Swinnerton | Mar. 24, 1953 |
| 2,652,658 | Barkey | Sept. 22, 1953 |
| 2,711,603 | Seidl | June 28, 1955 |

FOREIGN PATENTS

| | | |
|---|---|---|
| 229,051 | Germany | Nov. 30, 1910 |
| 601,415 | France | Nov. 30, 1925 |
| 945,630 | France | Nov. 29, 1948 |
| 657,992 | Great Britain | Oct. 3, 1951 |
| 666,207 | Great Britain | Feb. 6, 1952 |